(12) United States Patent
Nagaya et al.

(10) Patent No.: US 8,925,974 B2
(45) Date of Patent: Jan. 6, 2015

(54) CONNECTORS INCORPORATING RETAINERS AND STOPPER MECHANISMS

(75) Inventors: Takanori Nagaya, Aichi-ken (JP); Kenji Tozaki, Aichi-ken (JP); Morio Narita, Toyota (JP)

(73) Assignee: Togo Seisakusyo Corporation, Aichi-Ken (JP)

( * ) Notice: Subject to any disclaimer, the term of this patent is extended or adjusted under 35 U.S.C. 154(b) by 673 days.

(21) Appl. No.: 12/518,617

(22) PCT Filed: Dec. 26, 2007

(86) PCT No.: PCT/JP2007/074969
§ 371 (c)(1),
(2), (4) Date: Jul. 15, 2009

(87) PCT Pub. No.: WO2008/078778
PCT Pub. Date: Jul. 3, 2008

(65) Prior Publication Data
US 2010/0025987 A1     Feb. 4, 2010

(30) Foreign Application Priority Data

Dec. 27, 2006 (JP) .................... 2006-351633

(51) Int. Cl.
  *F16L 37/14*      (2006.01)
(52) U.S. Cl.
  CPC ................... *F16L 37/144* (2013.01)
  USPC ............................................ 285/320
(58) Field of Classification Search
  CPC .................................... F16L 37/144
  USPC ........................... 285/319, 320, 321
  See application file for complete search history.

(56) References Cited

FOREIGN PATENT DOCUMENTS

| JP | 64-26318 | | 1/1989 |
|---|---|---|---|
| JP | 11-22885 | | 1/1999 |
| JP | 2002-237346 | | 8/2002 |
| JP | 2002-310363 | | 10/2002 |
| JP | 2004-125130 | | 4/2004 |
| JP | 2004251319 A | * | 9/2004 |

* cited by examiner

*Primary Examiner* — Daniel P Stodola
*Assistant Examiner* — James Linford
(74) *Attorney, Agent, or Firm* — Christensen Fonder PA

(57) ABSTRACT

A connector has a pivot shaft extending axially between a pair of flanges of a connector body. The retainer includes a bearing portion at one end, with an expandable insertion slot engageable with the pivot shaft such that the retainer pivots about the pivot shaft. The retainer has a temporary engagement position where a pipe can be inserted and removed and a regular engagement position where a bulge portion of the pipe is engaged preventing the pipe from being removed. A stopper claw formed on an opening edge of the insertion slot contacts with a contact surface, preventing the connector body from pivoting beyond the temporary engagement position. This prevents a condition where the retainer further pivots past the temporary engagement position which can cause the insertion slot to expand and the retainer separating from the pivot shaft.

9 Claims, 16 Drawing Sheets

CONNECTORS INCORPORATING RETAINERS AND STOPPER MECHANISMS

PRIORITY CLAIM

The present application is a National Phase entry of PCT Application No. PCT/JP2007/074969, filed Dec. 26, 2007, which claims priority from Japanese Application No. 2006-351633, filed Dec. 27, 2006, the disclosures of which are hereby incorporated by reference herein in their entirety.

TECHNICAL FIELD

The present invention relates to connectors for piping connection.

BACKGROUND ART

Conventionally, as a connector for piping connection, one according to Japanese Laid-Open Patent Publication No. 2002-237346 has been known. According to this connector, a retainer for preventing detachment of a pipe is attached to a connector body via a pivot shaft such that it can pivot in a direction normal to an axial direction of the pipe. In particular, the pivot shaft is formed on an outer surface of the connector body along its axial direction, whereas a bearing portion for pivotally supporting the pivot shaft is formed on an end portion of the retainer. An opening for fitting therein the pivot shaft is expandably formed with the bearing portion. In attachment of the retainer, the pivot shaft can be fitted into the bearing portion by putting the pivot shaft at the opening and forcibly pressing the pivot shaft from a radial direction. In addition, a connector is known that further includes a means for holding a retainer in a temporary engagement position in order to prevent the retainer from unintentionally moving to a regular engagement position, and a means for detecting insertion of a pipe, and this connector is disclosed in Japanese Laid-Open Patent Publication No. 2004-125130.

A structure of the connector according to the aforementioned Japanese Laid-Open Patent Publication No. 2004-125130 will be described in reference to FIG. 19. A lock portion for engaging with a connector body 62 and holding the retainer 60 in the temporary engagement position where a pipe can be inserted into and detached from the connector body and a regular engagement position where the retainer 60 engages with the pipe and holds the pipe in non-detachable condition is formed on the retainer 60 at an opposite side to the bearing portion 61. However, when the lock at the temporary engagement position is released, the pivot movement toward an opposite side to the regular engagement position, that is, in a direction away from the connector body 62, is allowed. When the retainer 60 pivots to a certain position, an outer circumferential surface 63 of the retainer contacts with an outer circumferential surface of the connector body 62, and thus further pivot movement is stopped once (a condition in FIG. 19).

However, in the case of the known connectors, when a strong external force in a distancing direction is applied onto the retainer 60 or a torsional force is applied onto the retainer 60 in the contact position with this outer circumferential surface, there is a risk that the opening of the bearing portion expands and is removed from the pivot shaft 65.

SUMMARY

In accordance with one aspect of the invention, a connector has a connector body, a pivot shaft and a retainer. The connector body includes a fluid pathway extending therein, one end side where an insertion opening opens to allow insertion of a pipe having a bulge portion formed to protrude therefrom, and the other end side to which a piping tube can be connected. The pivot shaft is formed on the connector body along an axial direction. The retainer has a bearing portion with an insertion slot capable of fitting the pivot shaft therein from a radial direction. Fitting the pivot shaft into the bearing portion through the insertion slot enables the entire retainer to pivot about the pivot shaft between a regular engagement position close to the connector body and a maximum pivot position away from the connector body. The retainer is provided with a detachment preventing portion protruding into the fluid pathway and engaging with the bulge portion for preventing the pipe from being removed when the retainer pivots to the regular engagement position with the pipe positioned to be inserted into the insertion opening to a proper depth. A stopper mechanism is provided between the retainer and the connector body for preventing the retainer from pivoting toward the maximum pivot position beyond a stop position between the regular engagement position and the maximum pivot position. Here, the maximum pivot position is a position where an outer circumferential surface of the retainer contacts with an outer circumferential surface of the connector body, and the stop position is a position where the pivot movement toward the maximum pivot position is prevented by the stopper mechanism.

When the retainer is engaged in the regular engagement position, the detachment preventing portion of the retainer protrudes into the fluid pathway and engages with the bulge portion, so that the pipe is held in the connector body in a non-detachable condition.

In addition, if a force for pivoting toward the maximum pivot position is applied to the retainer in the stop position, the stopper mechanism engages, so that the retainer is reliably prevented from pivoting further more.

In one embodiment, the retainer can be held in a temporary engagement position between the regular engagement position and the stop position. When the retainer is positioned in the temporary engagement position, the detachment preventing portion is gotten away to the outside of the fluid pathway, so that the pipe can be inserted into and removed from the fluid pathway. When the pipe is inserted into the fluid pathway, the retainer can pivot in a direction for coming close to the regular engagement position. On the other hand, the stopper mechanism prevents the retainer in the temporary engagement position from pivoting toward a direction away from the regular engagement position.

When the retainer is positioned in the temporary engagement position, the stopper mechanism engages, so that the retainer is prevented from unintentionally pivoting from the temporary engagement position in a direction toward the maximum pivot position. Therefore, an operation for returning from the stop position to the temporary engagement position as a connector where the stop position and the temporary engagement position are separated is not required.

In another embodiment, the pivot shaft is provided at outside of the outer circumferential surface of the connector body and along the axial direction. On the other hand, opening edges (which may comprise opening surfaces) of the insertion slot formed on the bearing portion of the retainer are configured to oppose to each other in a radial direction of the connector body, and a stopper claw is configured to protrude from one of the opening edges positioned at inner side. The stopper mechanism is composed of the stopper claw and the outer circumferential surface of the connector body capable of engaging with the stopper claw.

The stopper claw is formed on the inner opening edge, and thus is not easily affected due to interference of other things. Accordingly, the stopper claw can be protected from damage or the like.

In another embodiment, an attaching portion for the retainer is formed as cylindrical tubular shape, and at least one flange is formed on the attaching portion to protrude outwardly with respect to a radial direction. The retainer is configured as substantial C-shape capable of fitting with the outer circumferential surface of the connector body, and is mounted adjacent to the flange. In addition, the retainer has the bearing portion for the pivot shaft at its end portion, and a stopper projection is configured to protrude outwardly from the bearing portion with respect to the axial direction of the connector body. The stopper mechanism is composed of the stopper projection and the engageable outer circumference of the flange.

Due to engagement between the stopper projection and the flange, pivot movement of the retainer beyond the stop position is prevented. In addition, this stopper mechanism can be configured by utilizing the flange for guiding the pivot movement of the retainer, and thus construction can be simplified.

In another embodiment, the stopper mechanism is composed of a hook portion formed on the opening edge of the bearing portion and a stopper wall formed on the pivot shaft. The stopper wall is formed by cutting out a part of the pivot shaft, and can engage with the hook portion.

Because the stopper mechanism is composed of the hook portion of the bearing portion and the stopper wall formed by cutting out the pivot shaft, construction of the stopper mechanism can be compact.

In another embodiment, the stopper mechanism is composed of a hook portion formed on an end opposed to the bearing portion of the retainer and a stepped stopper surface formed on a wall defining the fluid pathway of the connector body and capable of engaging with the hook portion.

Because the stopper mechanism is composed of the stepped stopper surface in the connector body and the hook portion of the retainer, the stopper mechanism is not exposed to outside environment, so that the stopper mechanism can be protected from damage due to interference of other things.

In the aforementioned embodiments, it is preferred that when the retainer is attached to the pivot shaft, the stopper mechanism engages at the same time.

When the retainer is attached, the stopper mechanism simultaneously prevents pivot movement. That is, because both an attaching position for the retainer and the temporary engagement position are set to be in the same position, an operation for moving to the temporary engagement position in a case of being set to be in separated positions is not required, so that its setup operation can be easier.

In another embodiment, a flat press surface for fitting the pivot shaft into the insertion slot is formed on the outer circumferential surface of the retainer. And, a normal direction to this press surface is set to be parallel to a direction for pressing the insertion slot against the pivot shaft.

In attachment of the retainer, a pressing force is exerted onto the press surface of the retainer for putting the pivot shaft at the insertion slot and pressing into. In this state, because the press surface is configured to be flat, it is easy to set a direction of the pressing force. Furthermore, the normal direction corresponding to the direction of the pressing force applied to the press surface and an opening direction of the insertion slot are parallel to each other, and thus fitting operation into the pivot shaft is smoothly carried out.

In accordance with a second aspect of the invention, a connector has a connector body, a retainer and a stopper mechanism. The connector body defines a fluid pathway therein, and has a first end capable of inserting a pipe therein and a second end opposite to the first end. The pipe has a bulge portion protruding outwardly in a radial direction. The retainer is connected to the connector body so as to be capable of being detached and pivoting between a first pivot position and a second pivot position about an axis. In addition, the retainer in the first pivot position engages with the pipe via the bulge portion in order to prevent the pipe from being removed from the connector body. On the other hand, the retainer in the second pivot position allows the pipe to be removed from the connector body. The stopper mechanism prevents the retainer from pivoting in an opposite direction to the first pivot position beyond the second pivot position. The retainer positioned in the second pivot position is prevented from being unintentionally removed from the connector body.

In one embodiment, the stopper mechanism includes a first stopper portion provided on the retainer body and a second stopper portion provided on the connector body. When the retainer is positioned in the second pivot position, the first stopper portion and the second stopper portion contact with each other.

It is preferred that unintentional detachment of the retainer is prevented by preventing movement in a removal direction of the bearing portion from the pivot shaft.

In another embodiment, prevention of movement in the removal direction of the bearing portion is carried out by making the removal direction of the retainer from the shaft in a state that the retainer is positioned in the second pivot position to be a direction substantially facing to an outer surface of the connector body.

In another embodiment, the first stopper portion is a stopper claw configured to protrude outwardly from the bearing portion of the retainer, and the second stopper portion is a stopper surface formed on a part of the outer surface of the connector body. The stopper claw is resiliently deformed by a pressure due to contact with the stopper surface and is pressed onto the pivot shaft in order to further prevent the movement of the bearing portion in the removing direction.

In another embodiment, the first stopper portion is one end in a pivot direction of a cut out recessed portion formed on one side edge of the retainer in an axial direction of the pivot shaft. In addition, the second stopper portion is a contact claw protruding from a flange portion of the connector body in the axial direction.

Figure 1:
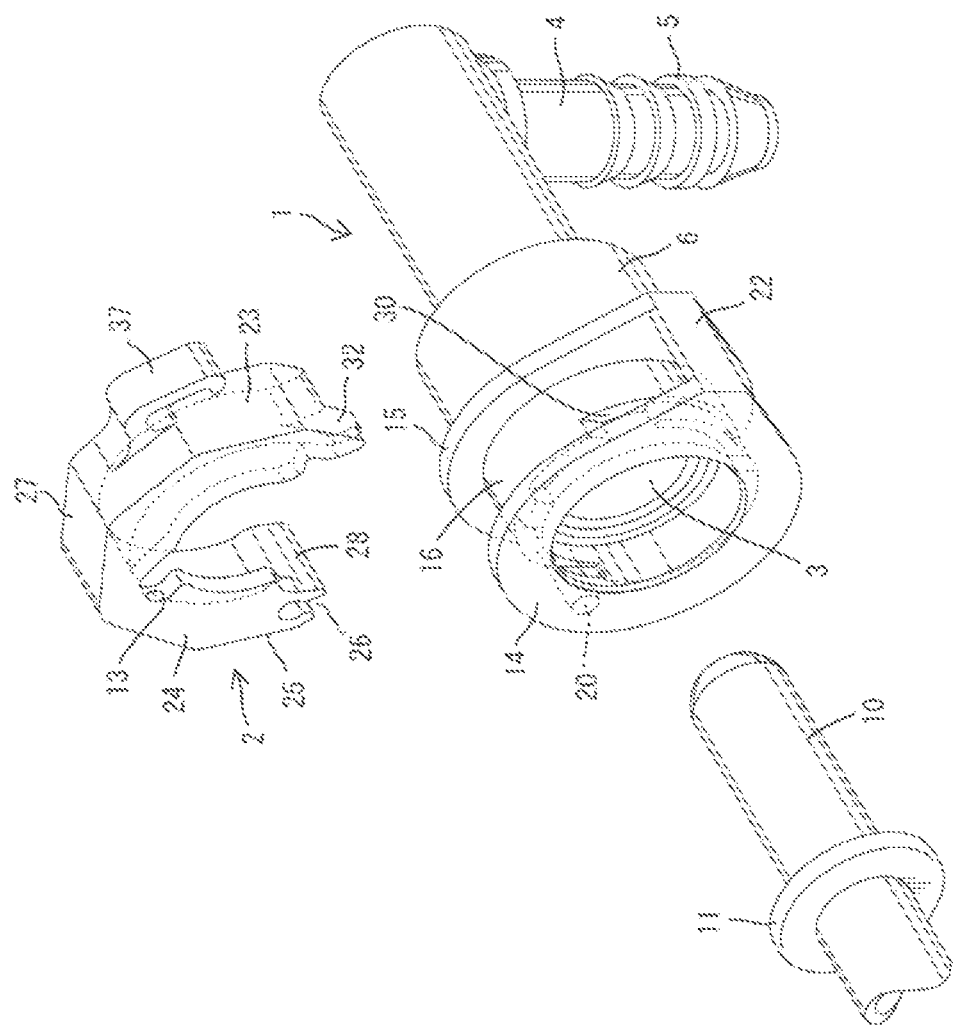
FIG. 1 is an exploded perspective view of a connector according to a first embodiment.
Figure 2:
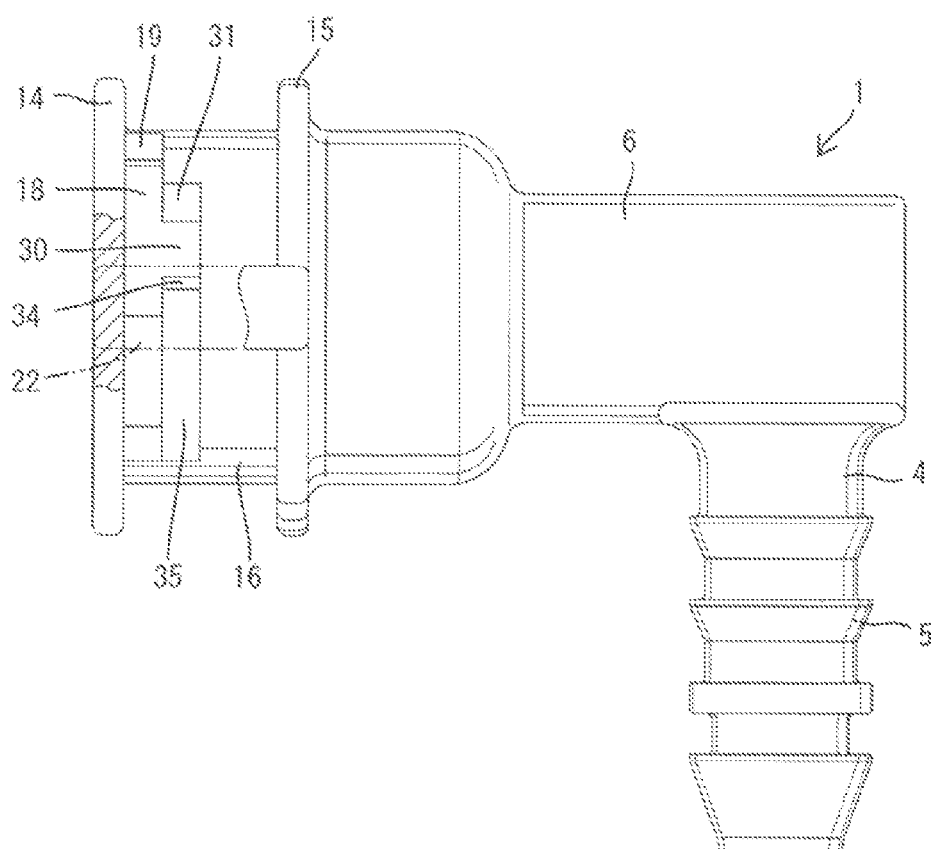
FIG. 2 is a side view of a connector body.

EXPLANATIONS OF NUMERALS 1 connector body
2 retainer
3 fluid pathway
10 pipe
11 bulge portion
20 pivot shaft
24 detachment preventing portion
25 bearing portion
26 insertion slot
27 press surface
28 stopper claw

DETAILED DESCRIPTION OF THE INVENTION

A first embodiment of the present invention will be described in reference to FIGS. 1 to 9. A connector of this embodiment is composed of a connector body 1 formed in a substantially cylindrical tubular shape and a retainer 2, each of which is formed into one piece from a synthetic resin.

The connector body 1 has a fluid pathway 3 therein along a central axis of the connector body 1, and is composed of a tube connector 4 and a pipe receiving portion 6 continuing with the tube connector 4 and curved at a substantial right angle therefrom. The tube connector 4 can be connected with a fuel tube not shown in the drawings. A plurality of ring-shape projections 5 for preventing detachment of the tube are formed on an outer circumferential surface of the tube connector 4. Here, with respect to the connector body, a side including the tube connector 4 is referred to as a front side, and a side having the retainer is referred to as a rear side.

Figure 8:
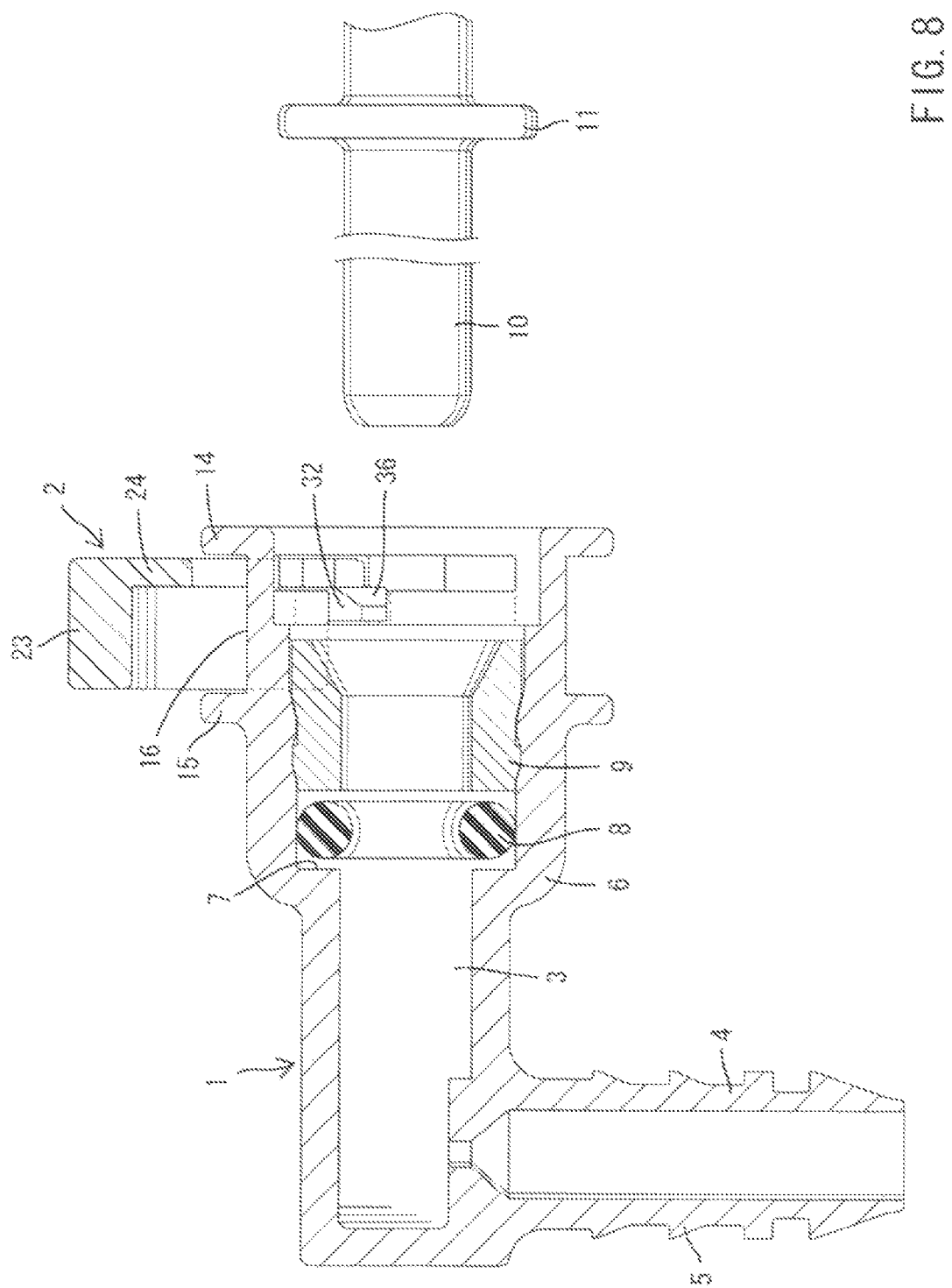
FIG. 8 is a sectional side view where the retainer is in the temporary engagement position.

As shown in FIG. 8, a stepped surface 7 is formed at a substantially central region in a longitudinal direction within the pipe receiving portion 6. An O-ring 8 for sealing against a pipe 10 is abutted to the stepped surface 7 and is prevented from being detached by an O-ring holder 9. In addition, the pipe 10 is made from metal (for example, one made from aluminum is available, and one made from synthetic resin is also available), and a radially protruding bulge portion 11 is formed at a position close to a front end and along a whole circumference. In the inside of the connector body 1, a contact edge 12 is formed along a circumference direction at a closer side to an inlet for the pipe 10 than the O-ring holder 9. A position where a front surface of the bulge portion 11 substantially contacts with the contact edge 12 such that the pipe cannot be inserted further more is referred to as a proper insertion depth (refer to FIG. 9).

An outer surface of the pipe receiving portion 6 close to its end is configured to be attached with the retainer 2. A rear flange 14 and a front flange 15 are mounted parallel back and forth on a rear edge of the pipe receiving portion 6 and a position forwardly away from it, respectively. As shown in FIG. 1, both of the flanges 14 and 15 are configured to protrude outwardly in a radial direction along the whole circumference of the outer surface of the connector body 1. In addition, an outer surface of the pipe receiving portion 6 positioned between both flanges 14 and 15 works as a retainer attaching surface 16 for attaching the retainer 2 thereto. A distance between the flanges 14 and 15 is configured to be substantially equal to or slightly broader than a width of the retainer 2, and thus, the movement of the retainer 2 is guided without generating torsion or the like by the flanges 14 and 15 during the pivot movement.

Figure 3:
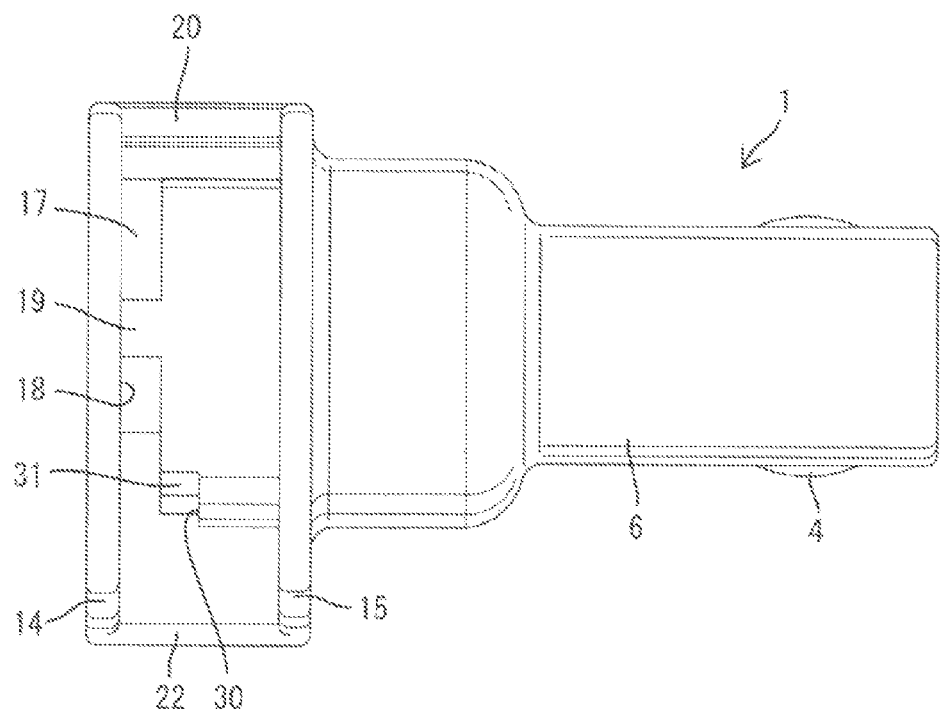
FIG. 3 is a plane view of the connector body.
Figure 9:
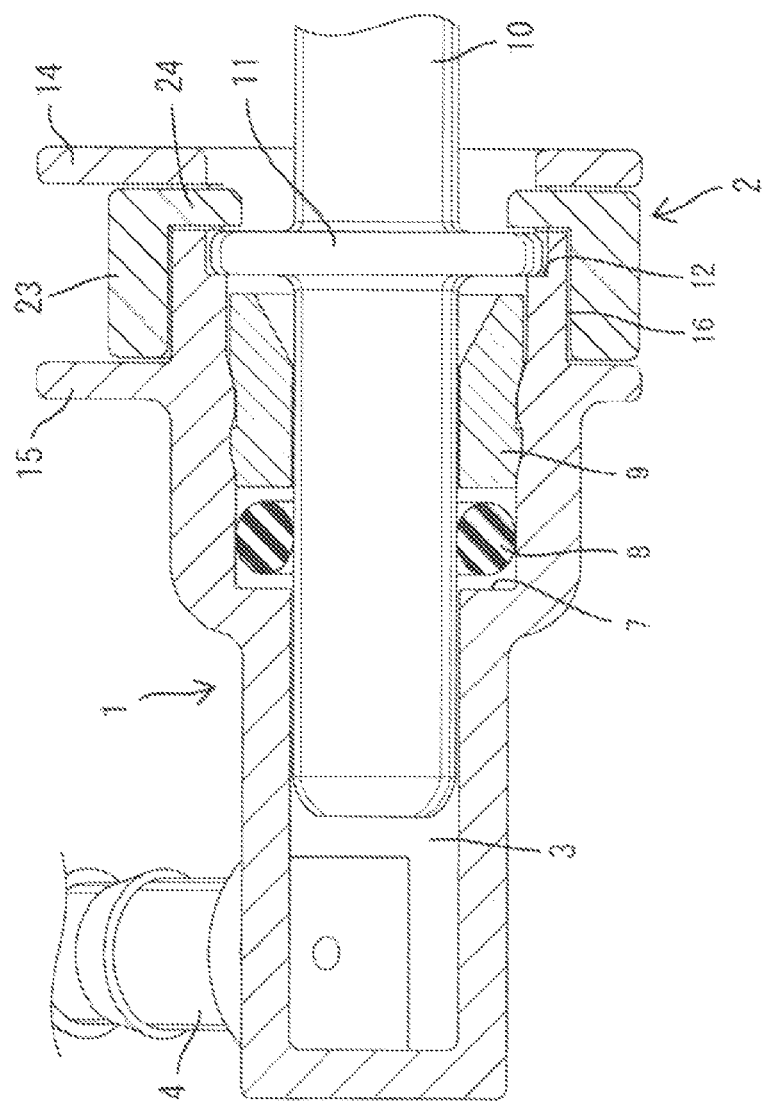
FIG. 9 is a sectional side view where the retainer is in the regular engagement position.

In addition, in the state where the pipe 10 is inserted by the proper depth, the bulge portion 11 is located between the flanges 14 and 15 (refer to FIG. 9). As shown in FIG. 3, a first opening 17 and a second opening 18 open at the retainer attaching surface 16 along a front surface of the rear flange 14 within a predetermined angle range. When the retainer 2 is located in the regular engagement position (in a state in FIGS. 7 and 9), these openings 17 and 18 allow a detachment preventing portion 24 described later to protrude into the inside of the connector body 1. Accordingly, the retainer 2 can prevent detachment of the pipe. In this embodiment, the first and the second openings 17 and 18 are configured to be separated by a partition piece 19. If both of the openings 17 and 18 are continuously formed without a presence of the partition piece 19, an opening area is too large, and thus the strength of the pipe receiving portion 6 decreases. A reason for providing the partition piece 19 is to prevent decrease of the strength.

Figure 5:
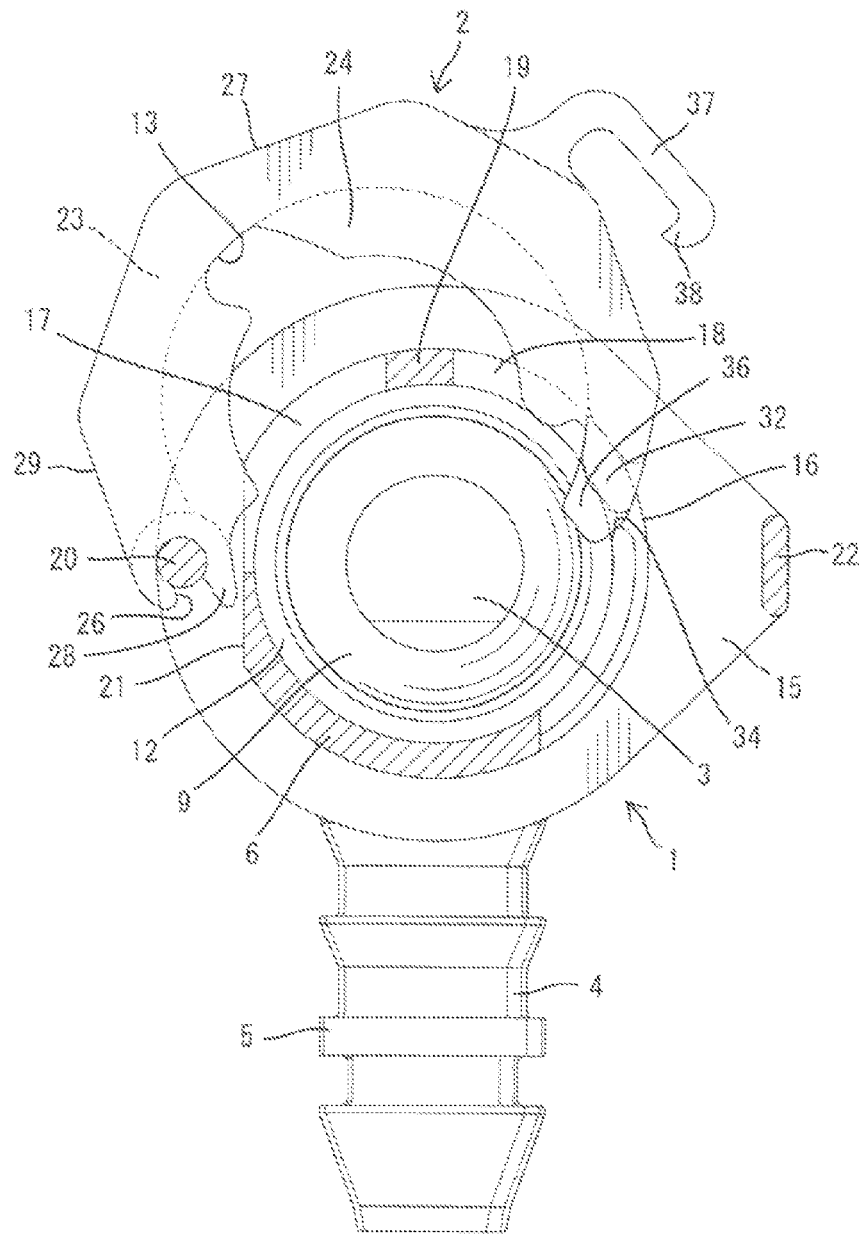
FIG. 5 is a sectional elevation view where the retainer is in a temporary engagement position.

As shown in FIG. 5, a pivot shaft 20 is provided at a position close to one end in a circumferential direction of the first opening 17. The pivot shaft 20 can support the retainer 2. In addition, the pivot shaft 20 is formed by connecting between both flanges 14 and 15 in the axial direction of the connector body 1. A flat contact surface 21 is formed on a surface in the retainer attaching surface 16 opposed to the pivot shaft 20.

In addition, a holding piece 22 is provided in the axial direction at the outside of the second opening 18. The holding piece can hold the retainer 2 in the regular engagement position. This holding piece 22 is formed by connecting outer edges of locally outwardly bulging parts of the flanges 14 and 15.

Next, the retainer 2 will be described. The retainer 2 has two functions for preventing detachment of the pipe 10 and for detecting a half insertion of the pipe 10. The retainer 2 is formed such that its width matches an interval between the flanges 14 and 15 in the pipe receiving portion 6 and that the whole configuration is a substantially C-shape. Accordingly, when the retainer 2 is in the regular engagement position, the retainer 2 can be mounted along the outer circumferential surface between the flanges 14 and 15.

As shown in FIG. 1, the retainer 2 is integrally composed of a circumferential surface portion 23 configured to fit with the retainer attaching surface 16 and a detachment preventing portion 24 configured to protrude inwardly along a rear edge of the circumferential surface portion 23. It is configured such that when the retainer 2 is mounted in the regular engagement position, the detachment preventing portion 24 is positioned at a rear surface side of the bulge portion 11, and an end edge of the detachment preventing portion 24 substantially reaches an outer circumferential surface of the pipe 10. However, when the retainer 2 is in the temporary engagement position, the detachment preventing portion 24 partially enters the first and second openings 17 and 18, but does not enter the fluid pathway 3, and is located at the outside of the fluid pathway 3 and allows insertion and removal of the pipe 10. In addition, a recessed portion 13 is formed on a central region in circumferential direction of the detachment preventing portion 24. When the retainer 2 is moved to the regular engagement position, the recessed portion 13 prevents the retainer 2 and the partition piece 19 from contacting with each other (refer to FIGS. 5 and 7).

A bearing portion 25 capable of fitting into the pivot shaft 20 is provided on one end side in a circumferential direction of the retainer 2. This bearing portion 25 has a substantially C-shape cross section formed throughout a width of the retainer 2, its opening portion is configured as an insertion slot 26 for the pivot shaft 20. When the bearing portion 25 is fitted into the pivot shaft 20, the retainer 2 can pivot about the pivot shaft 20 in a direction normal to the axial direction of the connector body 1.

A flat press surface 27 is formed on a central region with respect to a circumferential direction of the outer circumferential surface of a circumferential surface portion 23 of the retainer 2. The press surface 27 is a surface for applying an operational force when the retainer 2 is press fitted with the pivot shaft 20. A normal direction of the press surface 27 (L2 direction in FIG. 4) corresponding to a direction of application of the operational force is configured to be substantially parallel to an opening direction of the insertion slot 26 (L1 direction in FIG. 4). Accordingly, when the press surface 27 is pressed in a state that the insertion slot 26 is put at the pivot shaft 20, the retainer 2 is attached without interference of a stopper claw 28 described below with the connector body 1, and is held in the temporary engagement position shown in FIG. 5. In this embodiment, the retainer 2 can be held in both the temporary engagement position allowing insertion of the pipe 10 and the regular engagement position preventing the pipe 10 from being detached or removed.

In addition, a flat surface is formed on the circumferential surface portion 23 of the retainer 2 close to the bearing portion 25. The flat surface corresponds to a held surface 29 to be held during transportation of the retainer 2 by a part feeder.

Next, a temporary engage structure of the retainer 2 will be described. When a detection claw 32 provided on the retainer 2 and a detection hole 30 formed in the pipe receiving portion 6 engage with each other, the retainer 2 is held on the pipe receiving portion 6.

Figure 6:
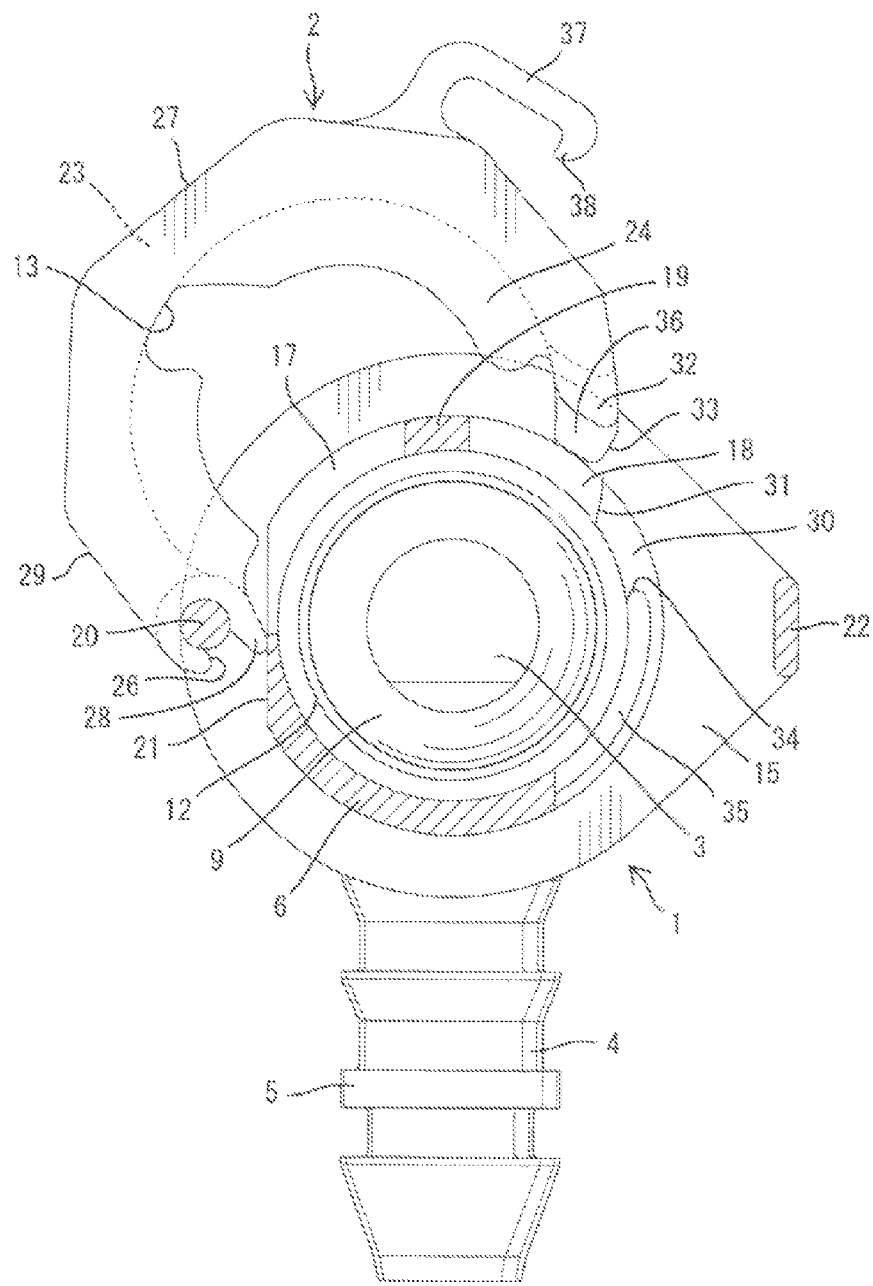
FIG. 6 is a sectional elevation view where the retainer is in a stop position.
Figure 7:
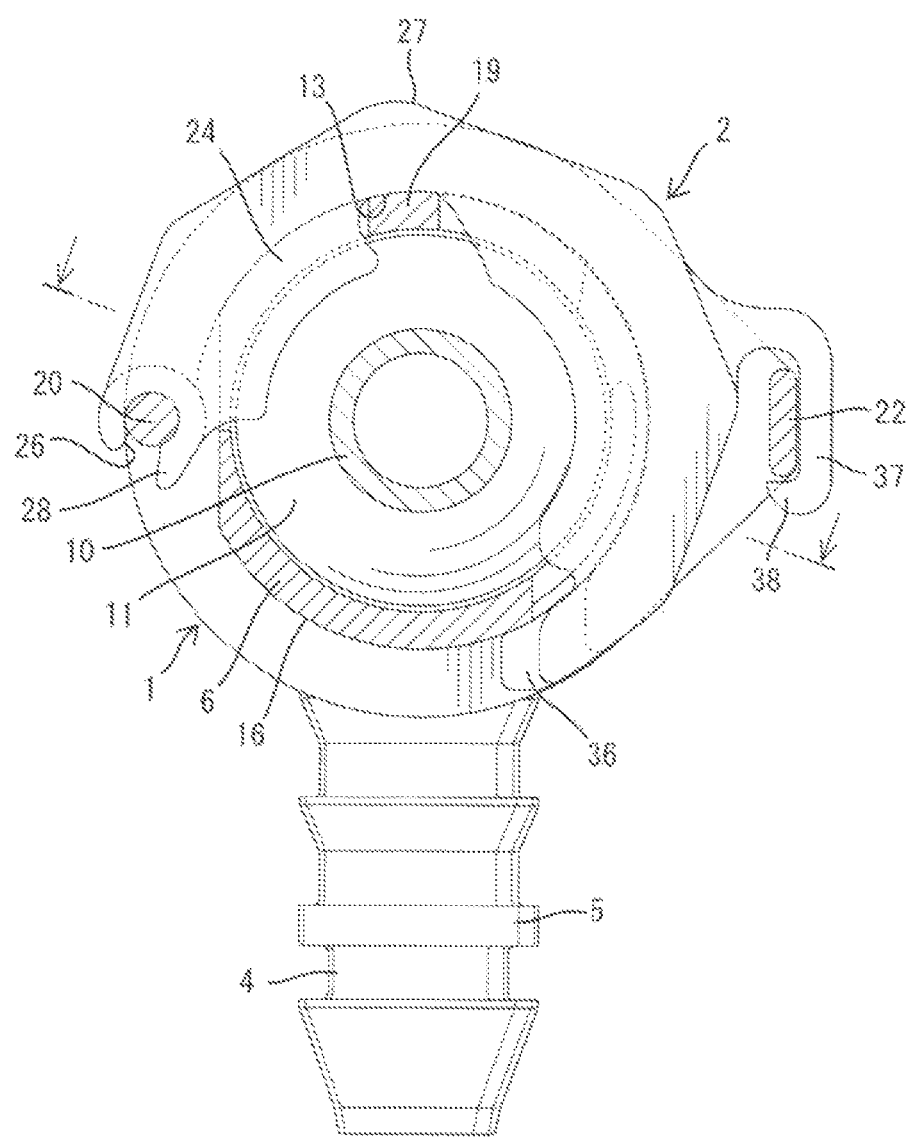
FIG. 7 is a sectional elevation view where the retainer is in a regular engagement position.

The second opening 18 is delimited by the partition piece 19 and configured to have a larger angle range than the first opening 17 (refer to FIG. 5). In addition, the detection hole 30 is formed by broadening a width of a central region with respect to the circumferential direction of the second opening 18. As shown in FIG. 6, a guide slope 31 is formed on an opening edge of the detection hole 30, which is close to the partition piece 19, and the slope 31 facilitates to fit the detection claw 32 into the detection hole 30. A movement control edge 34 is provided on one of the opening edges of the detection hole 30, which is opposed to the guide slope 31 (an edge close to the regular engagement position). The movement control edge 34 prevents the retainer 2 from unintentionally pivoting to the regular engagement position by contacting with a control surface 33 formed on an outer surface of the detection claw 32. In addition, this movement control edge 34 shown in the drawings is chamfered as an arch shape, so that the detection claw 32 can smoothly be removed from the detection hole 30. Furthermore, within a circumferential range from the movement control edge 34 to a terminal end of the second opening 18, a thin thickness portion 35 is configured to be thinned and have the same width as the movement control edge 34. During movement of the retainer 2 from the temporary engagement position to the regular engagement position, the detection claw 32 can slide on the thin thickness portion 35.

The detection claw 32 is configured to circumferentially extend from an opposite end to the bearing portion 25 of the retainer 2. This detection claw 32 has a substantially half width of the retainer 2, and is formed close to the rear flange 14. In addition, when the retainer 2 is in the temporary engagement position (a position shown in FIG. 5), the detection claw 32 protrudes into the fluid pathway 3 through the detection hole 30. When the retainer 2 is in the temporary engagement position, the detection claw 32 contacts with the bulge portion 11 of the pipe 10 inserted into the fluid pathway 3 to the proper depth. Furthermore, a rear surface of the detection claw 32 is configured as an ejection surface 36 formed to inwardly taper from the rear side toward the front side. An inclination of the ejection surface 36 is set such that when the ejection surface 36 contacts with the bulge portion 11, a force component can be applied in a direction for ejecting the detection claw 32 toward outside of the detection hole 30. Accordingly, during the insertion of the pipe 10 into the proper depth in the fluid pathway 3, the bulge portion 11 contacts with the ejection surface 36 of the detection claw 32. When the pipe 10 is pressed into the fluid pathway furthermore, the whole structure of the retainer 2 is deformed to expand such that the detection claw 32 is ejected from the detection hole 30, so that the engagement between the control surface 33 and the movement control edge 34 is released. In this condition, the detection claw 32 is ejected from the detection hole 30, and goes into a state of weakly engaging with the movement control edge 34. Accordingly, when the retainer 2 is pivotally moved toward the regular engagement position, the retainer 2 gets out of the weakly engaging state, and moves to the regular engagement position while causing the detection claw 32 to slide on the thin thickness portion 35.

Next, a regular engagement structure of the retainer 2 will be described. A catch claw 37 is configured to protrude at a position close to the detection claw 32 on the outer surface of the retainer 2 (refer to FIG. 4). The catch claw 37 has a substantial L-shape and protrudes outwardly from the circumferential surface portion 23 of the retainer 2, and a latch portion 38 having a hook shape is formed on an end of the catch claw 37. When the retainer 2 reaches the regular engagement position, the latch portion 38 can engage with the holding piece 22 of the connector body 1. The pivot movement of the retainer 2 to the temporary engagement position is prevented by the engagement between the latch portion 38 and the holding piece 22.

Figure 4:
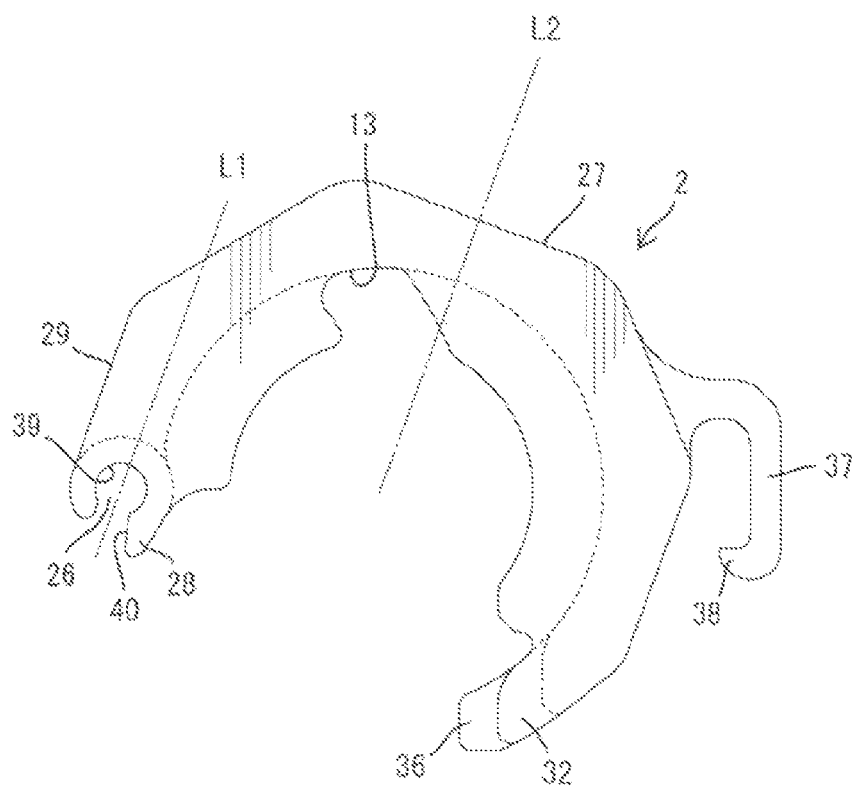
FIG. 4 is an elevation view of a retainer.

As shown in FIG. 4, a bearing hole 39 for pivotally fitting with the pivot shaft 20 is concavely formed on the bearing portion 25 of the retainer 2 in a width direction. In addition, as described previously, a part of the bearing portion 25 opens to define the insertion slot 26, which the pipe 10 can be fitted into from a radial direction. An opening width of the insertion slot 26 is slightly narrower than the bearing hole 39. Accordingly, when the pivot shaft 20 is fitted, slightly expanding deformation of the bearing portion 25 is required. In addition, one opening edge (which also comprises an inner opening surface) of the insertion slot 26 positioned at the inner side in the attached state of the retainer 2 to the connector body 1 is formed to be longer than an outer opening edge (which also comprises an outer opening surface), and serves as a portion of the stopper claw 28 constituting the stopper mechanism of the present invention. A straight surface 40, which may comprise a portion of the inner opening surface, for guiding the pivot shaft 20 into the insertion slot 26 is formed on an inner surface of the stopper claw 28. When the retainer 2 leaves from the temporary engagement position and slightly pivots in a retreat direction, the stopper claw 28 can contact with the contact surface 21 of the connector body 1 (refer to FIG. 6). The engagement depth in this contact condition is set to be enough such that when the retainer 2 additionally receives a force in a direction away from the connector body 1, the contact condition may not be released. Furthermore, when a force in the retreat direction is exerted onto the retainer 2 in this stop position, a force in a direction for closing the insertion slot 26 is applied to the stopper claw 28 by the contact surface 21, and thus it is able to reliably prevent the pivot shaft 20 from disengaging from the insertion slot 26.

Figure 19:
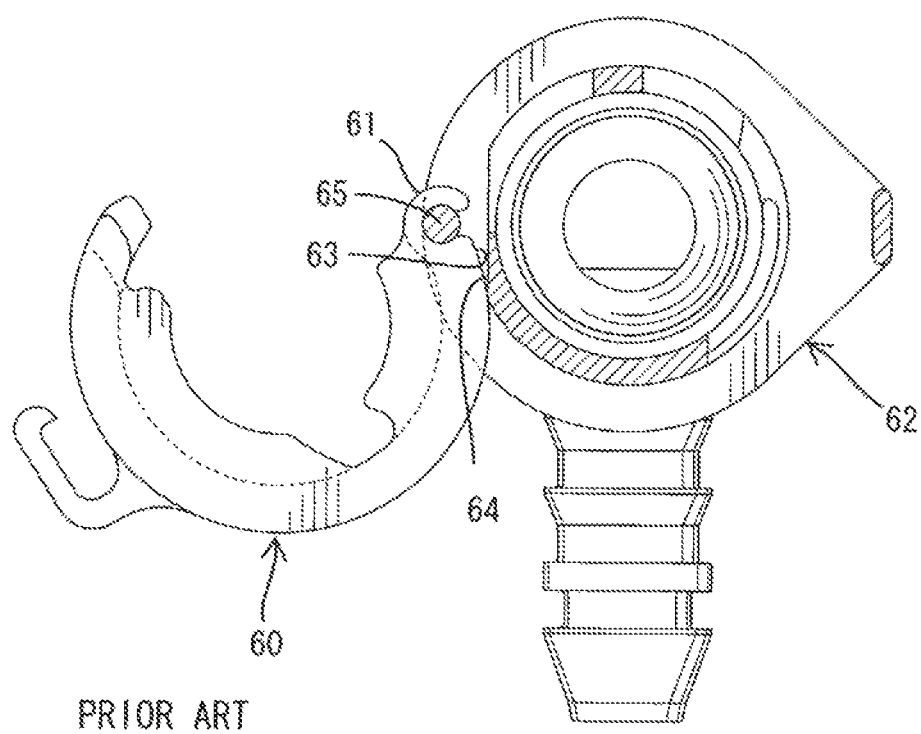
FIG. 19 is a cross sectional view where a known retainer is in a maximum pivot position.
Figure 20:
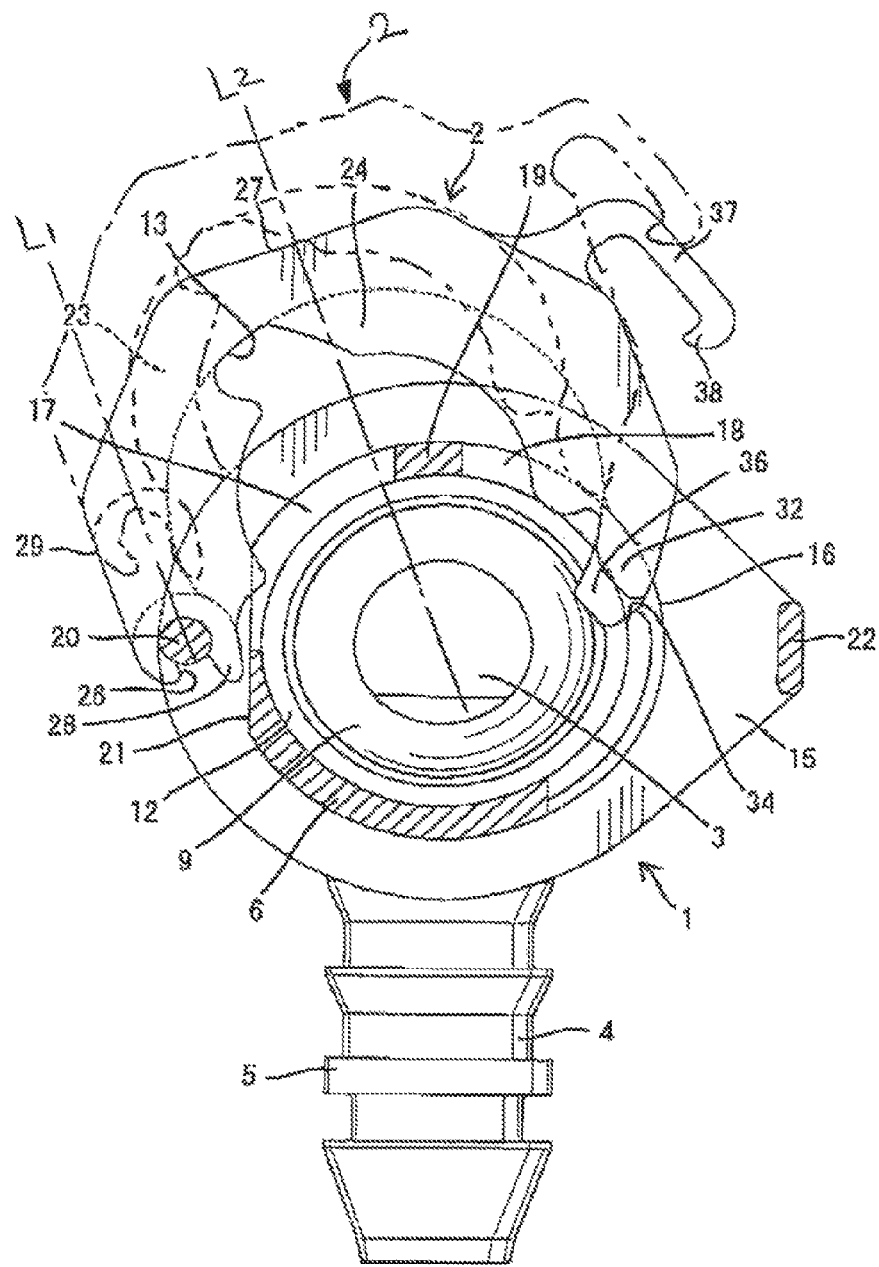

In addition, attachment of the retainer 2 can also be carried out at a position further away from the connector body 1 beyond the temporary engagement position. Accordingly, in this embodiment, it is also able to assume a maximum pivot position where the outer circumferential surface of the retainer 2 contacts with a side surface of the connector body 1 and the retainer cannot pivot further more in the retreat direction in a state that the end of the retainer 2 is made as a free end as shown in FIG. 19. However, the retainer 2 cannot pivot beyond a position shown in FIG. 6 (stop position) in the retreat direction, so that the retainer 2 does not actually reach the maximum pivot position.

Next, operations and effects of the first embodiment configured as aforementioned will be concretely described. As shown in FIG. 5, the connector in a state that the retainer 2 is assembled at the temporary engagement position is transported to a work site for inserting the pipe 10.

In order to assemble the retainer 2 at the temporary engagement position, the insertion slot 26 is expanded and the pivot shaft 20 is fitted into the bearing hole 39 by positioning the insertion slot 26 of the retainer 2 at the pivot shaft 20 and simultaneously bringing the detection claw 32 to contact with the retainer attaching surface 16 close to the detection hole 30, and thereafter pressing the press surface 27. In addition, the detection claw 32 simultaneously slides on the retainer attaching surface 16 and then fits into the detection hole 30. Therefore, the control surface 33 of the retainer 2 and the movement control edge 34 of the connector body 1 contact with each other in order to prevent the retainer 2 from moving to the regular engagement position. In addition, the detection claw 32 is pressed against the guide slope 31 in order to prevent the retainer 2 from pivoting in the retreat direction from the temporary engagement position. As described above, the direction for the pressing operation against the press surface 27 and the opening direction of the insertion slot 26 are parallel to each other, so that it is able to effectively exert a force for the fitting operation of the pivot shaft 20. In addition, the retainer 2 can be held in the temporary engagement position simultaneously with attachment of the retainer 2. Therefore, the operation for moving to the temporary engagement position is not required, and thus the assembly efficiency is improved.

When the pipe 10 is inserted into the connector body 1 in the temporary engagement condition as described above, the budge portion 11 contacts with the ejection surface 36 of the detection claw 32. When the pipe 10 is further inserted to the proper depth, the detection claw 32 is ejected outwardly in a radial direction due to sliding contact between the bulge portion 11 and the ejection surface 36, and thus the contact between the control surface 33 and the movement control edge 34 is released. However, when the pipe 10 is not inserted to the proper depth, the detection claw 32 is not ejected by the budge portion. Accordingly, the control surface 33 still contacts with the movement control edge 34, and thus it is impossible to move the retainer 2 to the regular engagement position.

After insertion of the pipe 10 to the proper depth, when the retainer 2 is pivotally moved toward the regular engagement position, the detection claw 32 of the retainer 2 releases the weak engagement with the movement control edge 34 and slides on the thin thickness portion 35. When the retainer 2 moves to a position where an inner surface of the circumferential surface portion 23 is positioned along and in contact with the retainer attaching surface 16, the latch portion 38 of the catch claw 37 elastically engages with the holding piece 22. The retainer 2 is held in the regular engagement position due to this engagement. As described previously, when the retainer 2 is moved to the regular engagement position, the detachment preventing portion 24 of the retainer 2 enters into both of the openings and engages with the rear surface of the bulge portion 11 in order to hold the pipe 10 in a non-detachable condition.

When the retainer 2 further pivots in the retreat direction beyond the temporary engagement position, the detection claw 32 of the retainer 2 is spaced away from the connector body 1 and is in a free state, however, an end portion of the stopper claw 28 contacts with the contact surface 21 at a side of the pivot shaft 20. As described above, the engagement in this state is set to be deep enough, so that even if a torsional force or a strong force in a direction away from the connector body 1 is applied to the retainer 2, the engagement is not released. That is, the engagement between the stopper claw 28 and the contact surface 21 is kept without change, and thus the retainer 2 is prevented from further pivoting in the direction away from the connector body 1. Furthermore, when a force in the aforementioned direction is applied to the retainer 2, the stopper claw 28 is deformed in a direction closing to the insertion slot 26 due to the force, so that it is able to certainly prevent the bearing portion 25 from disengaging from the pivot shaft 20.

In addition, in the first embodiment, the stopper claw is configured to protrude from the one positioned at inner side (a side closer to the connector body) of opening edges constituting the insertion slot, so that it is able to obviate a risk of damage due to foreign substances before happens.

Figure 10:
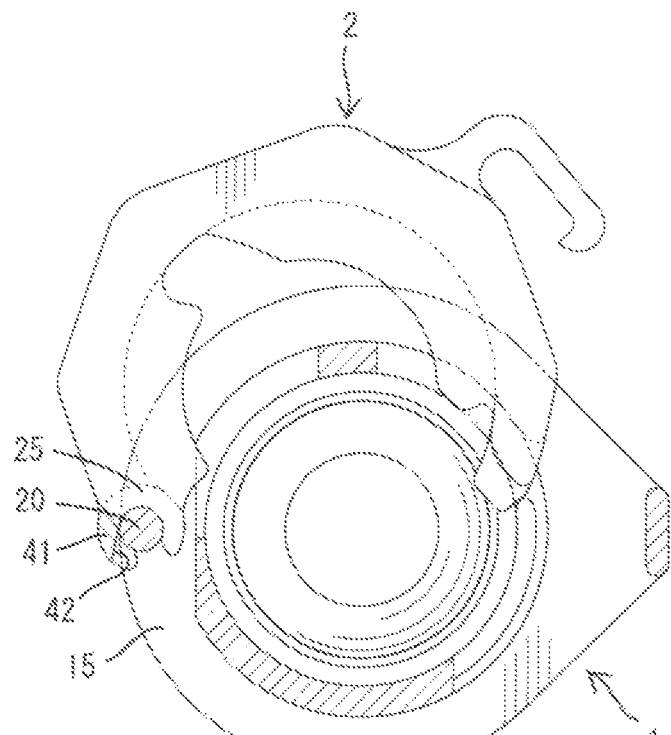
FIG. 10 is a cross sectional view of a main part of a connector according to a second embodiment, where a retainer is in a temporary engagement position.
Figure 11:
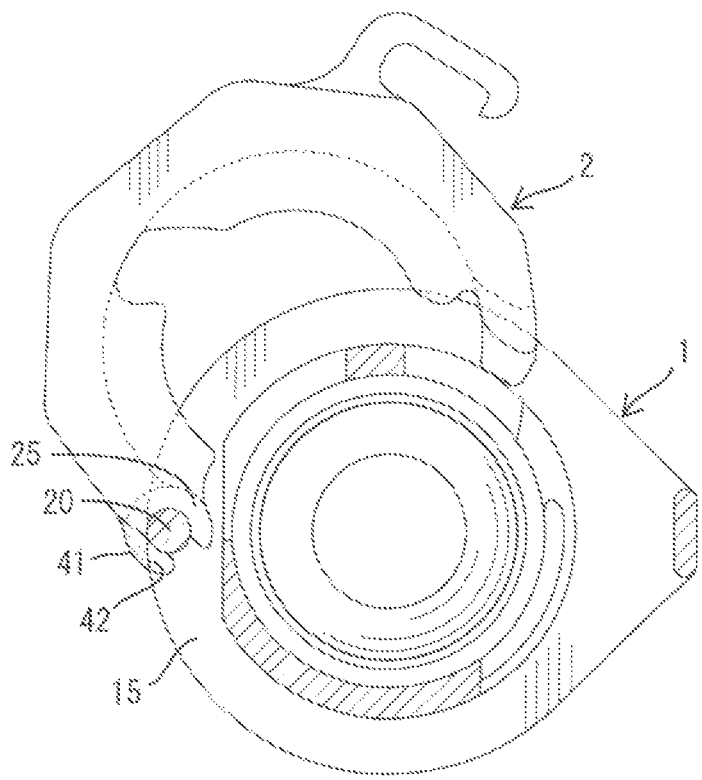
FIG. 11 is a cross sectional view of the connector according to the second embodiment, where a stopper works.

Next, a second embodiment of the present invention will be described in reference to FIGS. 10 and 11. The stopper mechanism is formed on the inner opening edge of the insertion slot 26 in the first embodiment, whereas one formed in an outer side will be exemplified in the second embodiment. That is, a pair of stopper pieces 41 are formed to protrude outwardly in the axial direction from opposite end surfaces with respect to the longitudinal direction of the bearing portion 25, and surfaces opposed to the flanges 14 and 15 are configured as flat surfaces 42. In addition, both stopper pieces 41 are spaced away from the rear flange 14 and the front flange 15 in the temporary engagement position shown in FIG. 10. However, when the retainer 2 further pivots from the temporary engagement position in the retreat direction, the flat surfaces 42 of the stopper pieces 41 contact with outer circumferential edges of the flanges 14 and 15 (refer to FIG. 11). The stopper pieces 41 are configured to have lengths for contacting with the flanges 14 and 15 with enough engaging tolerances, so that the retainer 2 cannot get out of the contact condition shown in FIG. 11, and its further pivot movement in the retreat direction is prevented.

Other configurations of the second embodiment are same as those of the first configuration, and thus the second embodiment has the same operations and effects as the first embodiment. Components having the same functions as the components of the first embodiment are labeled with the same reference numbers, and descriptions for such components are omitted.

In addition, the stopper pieces 41 do not always have to engage with both of the flanges 14 and 15, and can be formed on only one side in order to engage with only one of the flanges.

Figure 12:
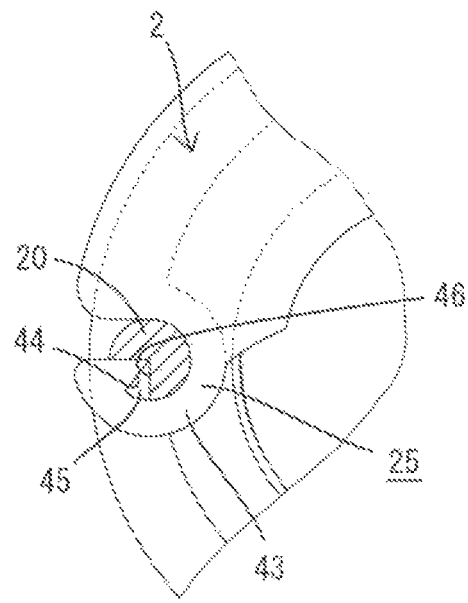
FIG. 12 is a cross sectional view of a main part of a connector according to a third embodiment, where a retainer is in a regular engagement position.
Figure 13:
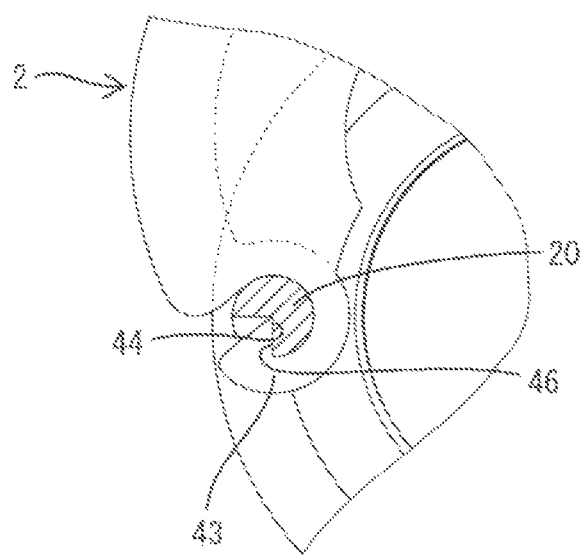
FIG. 13 is a cross sectional view of the connector according to the third embodiment, where a stopper works.

FIGS. 12 and 13 show a third embodiment of the present invention. In the third embodiment, a resiliently deformable hook portion 43 is formed on one of the opening edges of the bearing portion 25 positioned in an inner side, and a flat engage surface 44 is formed on an inner surface of the hook portion 43. Whereas, the pivot shaft 20 is cut out along its length and within an angle range of about 90 degrees, and this cutout portion is configured as a stopper recessed portion 45. The hook portion 43 is fitted within the stopper recessed portion 45, and the stopper recessed portion 45 and the hook portion constitute the stopper mechanism. FIG. 12 shows a state that the retainer 2 is in the regular engagement position. The engage surface 44 is spaced away from one of wall surfaces (stopper wall 46) within the stopper recessed portion 45 in this state, so that the retainer 2 is allowed to pivot toward the temporary engagement position. However, when the retainer 2 pivots beyond the temporary engagement position in the retreat direction, the engage surface 44 engages with the stopper wall 46 in a surface contact condition. Accordingly, the retainer 2 is prevented from further pivoting, so that it is possible to avoid a risk of disengagement of the retainer.

Other configurations are same as those of the first and second embodiments, and thus the same operation and effects can be exerted.

Figure 14:
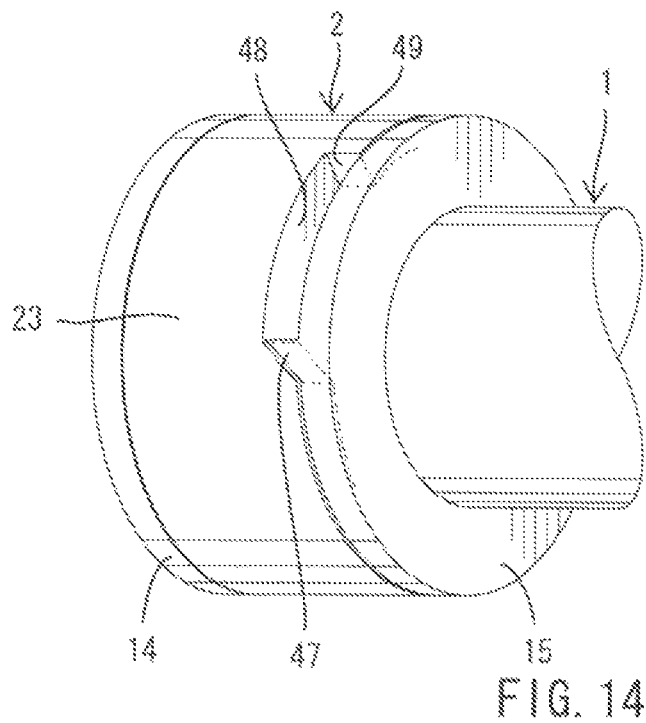
FIG. 14 is a cross sectional view of a main part of a connector according to a fourth embodiment, where a retainer is in a regular engagement position.
Figure 15:
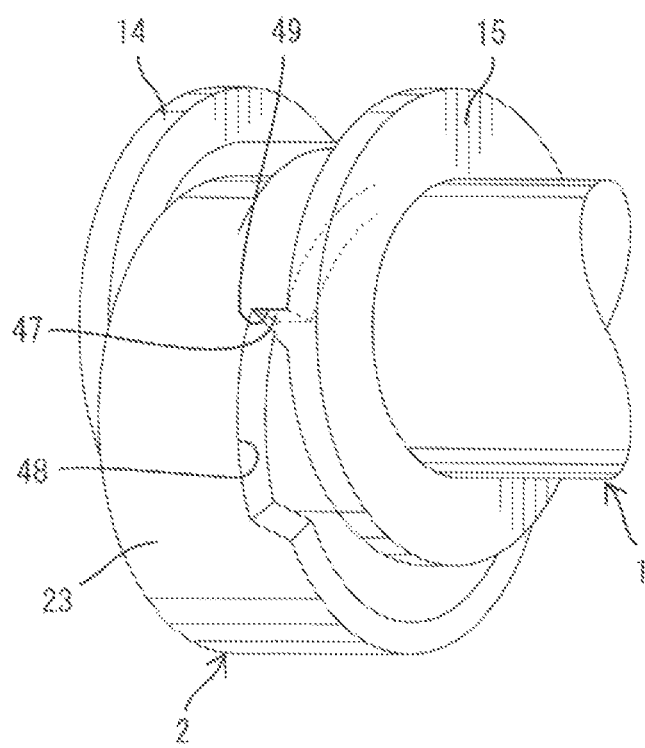
FIG. 15 is a cross sectional view of the connector according to the fourth embodiment, where a stopper works.
Figure 16:
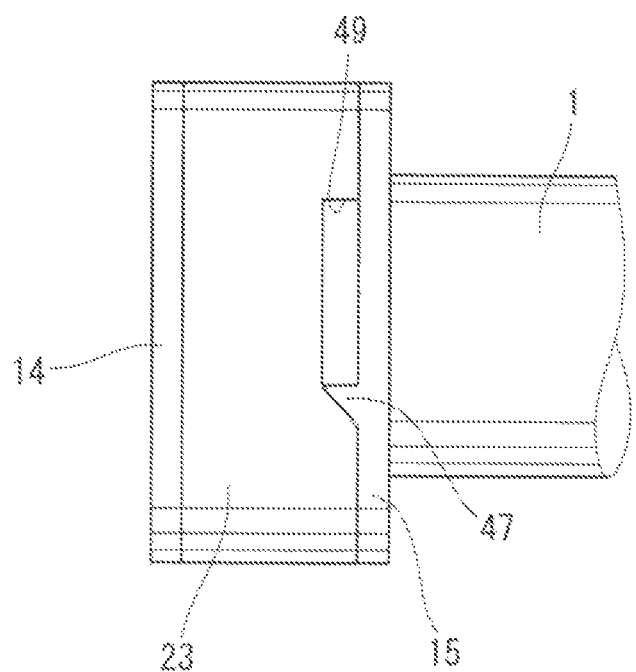
FIG. 16 is a side view of a main part of the connector according to the fourth embodiment, where the retainer is in the regular engagement position.

FIGS. 14 to 16 show a fourth embodiment of the present invention. In the fourth embodiment, a contact and stop claw 47 is formed to protrude inwardly with respect to the axial direction from an inner circumferential surface of the front flange 15. Whereas, a cutout recessed portion 48 is formed within a predetermined angle range on the circumferential surface portion 23 of the retainer 2. FIGS. 14 and 16 show a state that the retainer 2 is in the regular engagement position, and in this state, the contact claw 47 is positioned away from a stopper end surface 49 within the cutout recessed portion 48 and accommodates with the other end surface. On the other hand, the contact claw 47 is configured to engage with the stopper end surface 49 when the retainer pivots to a position shown in FIG. 15. The stopper end surface 49 and the contact claw 47 are formed to define surfaces parallel to the axial direction, and contact with each other at the surfaces normal to the pivot direction of the retainer 2, and thus, even if a strong force is exerted on the retainer 2, the engagement is not released. Accordingly, the retainer 2 cannot further pivot in the retreat direction, and thus it is able to avoid a risk of disengagement of the retainer.

Other configurations are same as those of the first to third embodiments, so that the same operation and effects can be exerted.

Figure 17:
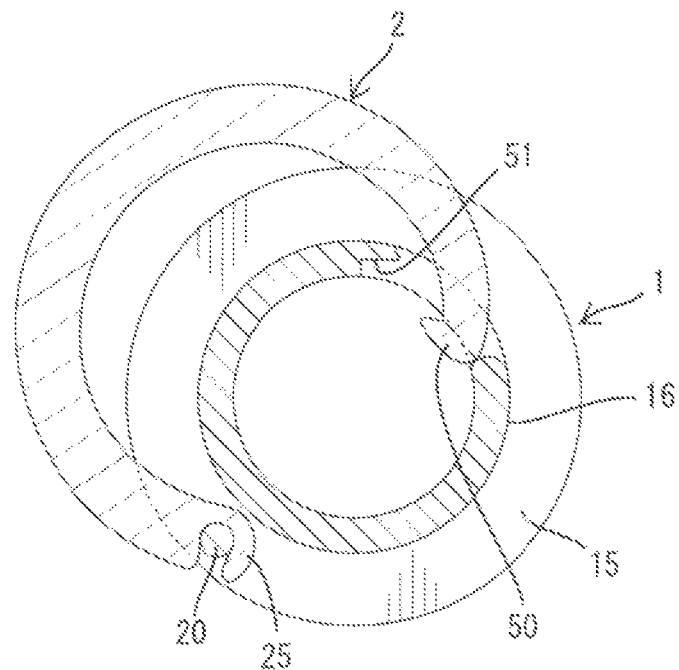
FIG. 17 is a cross sectional view of a main part of a connector according to a fifth embodiment, where a retainer is in a temporary engagement position.
Figure 18:
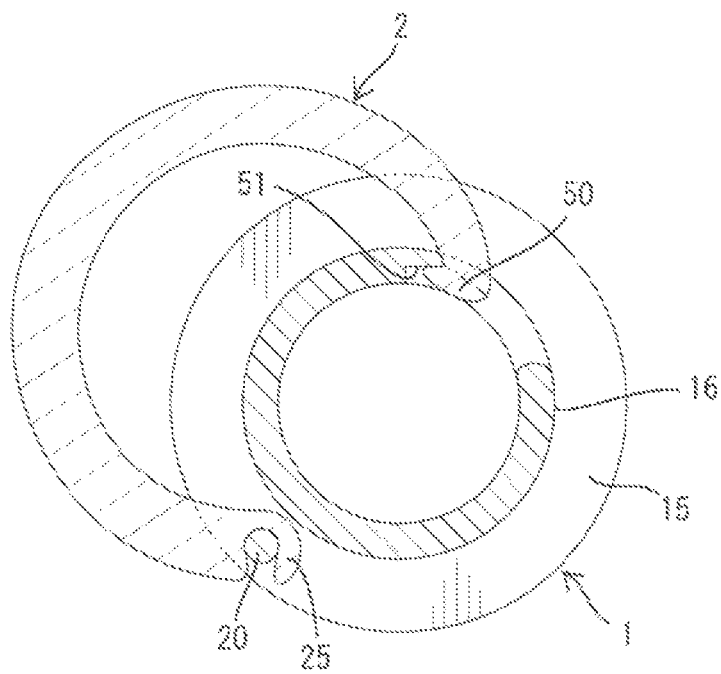
FIG. 18 is a cross sectional view of the connector according to the fifth embodiment, where a stopper works.

FIGS. 17 and 18 show a fifth embodiment of the present invention. Although these drawings are simplified, the construction of this embodiment corresponds to the construction of the first embodiment added with the following construction.

In addition to the detection claw, a hook portion 50 is formed on the opposite end to the bearing portion 25 of the retainer 2. In addition, a stepped stopper surface 51 is formed on an inner surface of the opening edge of the second opening 18 in the retainer attaching surface 16. FIG. 17 shows a state that the retainer 2 is in the temporary engagement position and that the hook portion 50 and the stepped stopper surface 51 are spaced away from each other. However, in a state that the detection claw is substantially ejected from the detection hole due to proper insertion of the pipe not shown in the drawings, when the retainer slightly pivots in the retreat direction as shown in FIG. 15, the hook portion 50 engages with the stepped stopper surface 51 in a surface contact condition, and thus the retainer 2 is prevented from further pivoting. Accordingly, it is able to avoid a circumstance that the retainer 2 disengages.

Other configurations are same as those of the first to fourth embodiments, and thus it is able to have the same operation and effects.

The present invention is not limited to the embodiments explained by the above descriptions and the drawings. For example, the following embodiments are included within the technical scope of the present invention. Furthermore, other than the following, various modifications can be made and carried out without departing from the gist of the invention.

(1) In any of the embodiments, the number of the stopper mechanisms should not be restricted.

(2) The temporary engagement position does not always have to be provided, and it is only necessary to provide at least two positions including a position for attaching the retainer and the regular engagement position.

The invention claimed is:

1. A connector comprising:
a connector body including a fluid pathway formed therein to extend therethrough, one end having an insertion opening that opens to allow insertion of a pipe having a bulge portion formed to protrude therefrom, and the other end to which a tube can be connected;
a pivot shaft formed on the connector body, the pivot shaft defining a pivot axis; and
a retainer having a bearing portion with an insertion slot capable of fitting with the pivot shaft from a direction radial to the pivot axis, wherein fitting the pivot shaft into the bearing portion through the insertion slot enables the entire retainer to pivot about the pivot shaft between a regular engagement position and a stop position,
wherein the pipe is inserted into the insertion opening such that the bulge portion is inserted to reach at least an inner edge of a first flange, the retainer is provided with a detachment preventing portion protruding into the fluid pathway and engaging with the bulge portion for preventing the pipe from being removed when the retainer pivots to the regular engagement position, and the connector body has on an outer circumferential surface of the connector body a flat surface between an axis of the connector body and the axis of the pivot shaft and being parallel to both the axis of the connector body and the axis of the pivot shaft, and
wherein the pivot shaft is provided along the outer circumferential surface of the connector body, the bearing portion of the retainer is configured such that the insertion slot is defined by an inner opening surface and an outer opening surface which are opposed to each other, the inner opening surface being closer to the connecter body than the outer opening surface in a direction radial to the axis of the connector body, at least when the retainer is in the regular engagement position, and the inner opening surface being formed to be longer than the outer opening surface and serving as a portion of a stopper claw such that when a force is applied to the retainer in a removing direction wherein the retainer moves away from the regular engagement position and towards the stop position, the stopper claw engages the flat surface of the connector body at the stop position, thereby preventing the retainer from pivoting beyond the stop position.

2. The connector according to claim 1, wherein between the regular engagement position and the stop position, the retainer can be held in a temporary engagement position where the detachment preventing portion is maintained on a periphery of the fluid pathway, the pipe can be inserted into the fluid pathway, and the retainer can pivot in a forward direction towards the regular engagement position.

3. The connector according to claim 2, wherein: engagement of the stopper claw with the flat surface of the connector body is carried out in connection with an operation for attaching the retainer to the pivot shaft.

4. The connector according to claim 1, wherein: a press surface is formed on an outer circumferential surface of the retainer as a flat surface for fitting the pivot shaft into the insertion slot.

5. A connector comprising:
a connector body defining a fluid pathway therein and a connector body axis, and having a first end capable of inserting a pipe therein and a second end opposite to the first end, wherein the pipe has a bulge portion protruding outwardly from the pipe in a direction radial to the connector body axis;
a retainer connected to the connector body capable of being pivoted between a first pivot position and a second pivot position about a pivot axis, wherein the retainer in the first pivot position engages with the pipe via the bulge portion in order to prevent the pipe from being removed from the connector body, and the retainer in the second pivot position allows the pipe to be removed from the connector body;
a stopper mechanism configured to prevent the retainer from pivoting beyond the second pivot position in a rotational direction away from the first pivot position and toward the second pivot position; and
wherein the stopper mechanism comprises a first stopper portion provided on the connector body and a second stopper portion provided on the retainer, and when the retainer is positioned in the second pivot position, the first stopper portion and the second stopper portion contact with each other;
wherein the connector body has a shaft member defining the pivot axis of the retainer, the retainer has a bearing portion detachably fitted with the shaft member from a direction radial to the pivot axis, and
wherein the second stopper portion is a stopper claw formed to protrude outwardly from the bearing portion of the retainer, the first stopper portion is a stopper surface formed on a part of an outer surface of the connector body, and the stopper surface is a flat surface positioned between the connector body axis and the pivot axis of the retainer and being parallel to both the axis of the connector body and the pivot axis of the retainer; and
wherein an insertion slot of the bearing portion is defined by opening surfaces positioned at an inner side and an outer side, respectively, one of the opening surfaces positioned at the inner side being formed to be longer than the other of the opening surfaces, the opening surface at the inner side being closer to the connecter body than the opening surface at the outer side in a direction radial to the connector body axis at least when the retainer is in the first pivot position, so that when a force is applied to the retainer causing the retainer to pivot in a removing direction from the first pivot position to the second pivot position, the retainer positioned in the second pivot position is prevented from being removed from the connector body by preventing the retainer from pivoting beyond the second pivot position in the removing direction when the first and second stopper portions abut each other.

6. The connector according to claim 5, wherein: the prevention of detachment of the retainer is further carried out by preventing the bearing portion from moving in the removing direction away from the pivot shaft.

7. The connector according to claim 6, wherein: the prevention of the movement of the bearing portion in the removing direction is carried out by making the removing direction of the retainer from the shaft member in a state that the retainer is positioned in the second pivot position to be a direction substantially facing to an outer surface of the connector body.

8. The connector according to claim 5, wherein: the stopper claw remains attached to the pivot shaft when a force causing deformation of the stopper claw is applied in a retreat direction while the retainer is in the stop position, such that the stopper claw is in contact with the stopper surface.

9. A connector comprising:
a connector body including a fluid pathway formed therein to extend therethrough, one end having an insertion opening that opens to allow insertion of a pipe having a bulge portion formed to protrude therefrom, and the other end to which a tube can be connected;
a pivot shaft formed on the connector body, the pivot shaft defining a pivot axis; and
a retainer having a bearing portion with an insertion slot capable of fitting with the pivot shaft from a direction radial to the pivot axis, wherein fitting the pivot shaft into the bearing portion through the insertion slot enables the entire retainer to pivot about the pivot shaft between a regular engagement position and a stop position,
wherein the pipe is inserted into the insertion opening such that the bulge portion is inserted to reach at least inner edge of a first flange, the retainer is provided with a detachment preventing portion protruding into the fluid pathway and engaging with the bulge portion for preventing the pipe from being removed when the retainer pivots to the regular engagement position;
wherein the connector body has on an outer circumferential surface of the connector body a flat surface positioned between an axis of the connector body and an axis of the pivot shaft and being parallel to both the axis of the connector body and the axis of the pivot shaft;
wherein the retainer includes a stopper mechanism comprising an end portion of the retainer that is configured to engage the flat surface of the connector body, thereby preventing the retainer from pivoting beyond the stop position in a rotational direction away from the regular engagement position and towards the stop position;
wherein between the regular engagement position and the stop position, the retainer can be held in a temporary engagement position where the detachment preventing portion is maintained on a periphery of the fluid pathway, the pipe can be inserted into the fluid pathway, and the retainer can pivot in a forward direction towards the regular engagement position; and wherein the insertion slot of the bearing portion is defined by opening surfaces positioned at an inner side and an outer side, respectively, one of the opening surfaces positioned at the inner side being formed to be longer than the other of the opening surfaces, the opening surface at the inner side being closer to the connecter body than the opening surface at the outer side in a direction radial to the connector body axis at least when the retainer is in the regular engagement position.

\* \* \* \* \*

UNITED STATES PATENT AND TRADEMARK OFFICE
CERTIFICATE OF CORRECTION

PATENT NO. : 8,925,974 B2
APPLICATION NO. : 12/518617
DATED : January 6, 2015
INVENTOR(S) : Takanori Nagaya, Kenji Tozaki and Morio Narita Page 1 of 1

It is certified that error appears in the above-identified patent and that said Letters Patent is hereby corrected as shown below:

On the Title Page, Col. 1, in Item "73", under Assignee insert:

--Toyota Jidosha Kabushiki Kaisha,
Aichi-Ken, Japan--

Signed and Sealed this
Twenty-second Day of December, 2015

Michelle K. Lee
*Director of the United States Patent and Trademark Office*